United States Patent
Chang et al.

(10) Patent No.: US 8,315,316 B2
(45) Date of Patent: Nov. 20, 2012

(54) DIGITAL BROADCASTING TRANSMISSION/RECEPTION SYSTEM UTILIZING MULL PACKET AND TRS CODE TO IMPROVE RECEIVING PERFORMANCE AND SIGNAL PROCESSING METHOD THEREOF

(75) Inventors: Yong-deok Chang, Suwon-si (KR);
Joon-soo Kim, Yongin-si (KR);
Sung-woo Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1056 days.

(21) Appl. No.: 12/261,280

(22) Filed: Oct. 30, 2008

(65) Prior Publication Data
US 2009/0129515 A1    May 21, 2009

Related U.S. Application Data

(63) Continuation of application No. 11/587,926, filed as application No. PCT/KR2005/001661 on Jun. 3, 2005.

(30) Foreign Application Priority Data

Jun. 7, 2004   (KR) ................................ 2004-41295
Jun. 2, 2005   (KR) ................................ 2005-47149

(51) Int. Cl.
   *H04N 7/12*    (2006.01)
(52) U.S. Cl. .................... 375/240.27; 348/723
(58) Field of Classification Search ................ None
See application file for complete search history.

(56) References Cited

U.S. PATENT DOCUMENTS 6,032,283 A * 2/2000 Meyer ........................... 714/746
6,810,084 B1 * 10/2004 Jun et al. .................. 375/240.28
2001/0034867 A1 10/2001 Jaffe et al.

FOREIGN PATENT DOCUMENTS
KR    2001-111667    12/2001

OTHER PUBLICATIONS

PCT Preliminary Report on Patentability dated Dec. 21, 2006 issued in PCT/KR 2005/001661.

* cited by examiner

*Primary Examiner* — Sath V Perungavoor
*Assistant Examiner* — Christopher Findley
(74) *Attorney, Agent, or Firm* — Stanzione & Kim, LLP

(57) ABSTRACT

A digital broadcasting transmission and/or reception system having an improved reception performance and a signal-processing method thereof. A digital broadcasting transmitter comprises a TRS encoder for to TRS-encode a MPEG-2 transmission stream having null data for inserting a Known data and a TRS parity at predetermined positions, randomizer to input and randomize data stream from the TRS encoder, a null packet exchanger to replace the null data for inserting the Known data to the known data, and an encoder for encoding a data streams to which the Known data is inserted. Accordingly, the present invention detects the known data from a signal received from a reception side and uses the detected known data for synchronization and equalization and further uses the TRS parity for correcting error of the received signal, so that the digital broadcasting reception performance can be improved at poor multipath channels.

14 Claims, 9 Drawing Sheets

DIGITAL BROADCASTING TRANSMISSION/RECEPTION SYSTEM UTILIZING MULL PACKET AND TRS CODE TO IMPROVE RECEIVING PERFORMANCE AND SIGNAL PROCESSING METHOD THEREOF

This application is a continuation of prior application Ser. No. 11/587,926, filed Oct. 26, 2006, in the U.S. Patent and Trademark Office, now pending, which claims priority from Korean Patent Application No. 2004-41295 and 2005-47149, filed on Jun. 7, 2004 and Jun. 2, 2005, respectively, in the Korean Intellectual Property Office, and International application PCT/KR2005/001661, filed on Jun. 3, 2005, the disclosures of which are incorporated herein in their entirety by reference.

TECHNICAL FIELD

The present invention relates to a digital broadcasting transmission/reception system, and more specifically, to a digital broadcasting transmission/reception system transmitting predefined known data with a supplementary reference signal (SRS) added to an Moving Picture Experts Group-2 transport stream (MPEG-2 TS) to improve performance of a reception system and utilizing a transversal Reed Solomon (TRS) code to reinforce error-correcting capacity and a signal processing method thereof.

BACKGROUND ART

The Advanced Television Systems Committee Vestigial Sideband (ATSC VSB) method, a U.S-oriented terrestrial waves digital broadcasting system, is a single carrier method and uses a field sync by 312 segment unit. Accordingly, reception performance is not good at poor channels, especially at a doppler fading channel.

FIG. 1 is a block diagram of a transmitter/receiver of a general U.S-oriented terrestrial waves digital broadcasting system according to the ATSC digital television (DTV) standards.

The digital broadcasting transmitter of FIG. 1 has a randomizer (110) for randomizing an MPEG-2 TS, an Reed-Solomon (RS) encoder (120) of a concatenated coder form for adding a parity byte to the TS to correct errors generated by channel characteristics on transmission, an interleaver (130) for interleaving the RS encoded data in a certain pattern, and a ⅔ rate Trellis encoder (140) for performing ⅔ rate Trellis encoding and 8 level symbol mapping of the interleaved data, so that error-correcting encoding of the MPEG-2 TS is performed.

Further, the digital broadcasting transmitter has a multiplexer (150) for inserting a field sync and segment sync in the error-correcting encoded data as a data format of FIG. 2, and a modulator (160) for adding a certain DigiCipher (DC) value to the data symbol inserted with the segment sync and field sync, inserting a pilot tone therein, performing pulse-shaping and vestigial sideband (VSB) modulation, up-converting them into a signal of RF channel band and transmitting them.

Accordingly, the digital broadcasting transmitter randomizes the MPEG-2 TS through the randomizer (110), the randomized data are outer-coded through the RS encoder (120) which is an outer coder, and the outer-coded data are dispersed through the interleaver (130). In addition, the interleaved data are innerfcoded by 12 symbol unit through the Trellis encoder (140) and the inner-coded data are mapped with a 8 level symbol, inserted with the field sync and segment sync, inserted with the pilot tone, VSB-modulated, up-converted into a RF signal and transmitted.

Meanwhile, the digital broadcasting receiver of FIG. 1 has a tuner (not shown) for down-converting the RF signal received through a channel into a basic signal, a demodulator (210) for performing sync detection and demodulation of the down-converted basic signal, an equalizer (220) for conpensating channel distortion which is generated by multipath in the demodulated signal, a Viterbi decoder (230) for correcting errors in the equalized signal and decoding the signal in symbol data, a deinterleaver (240) for rearranging the data dipersed by the interleaver (130) of the digital broadcasting transmitter, an RS decoder (250) for correcting errors and a derandomizer (260) for derandomizing the data corrected through the RS decoder (250) and outputting the MPEG-2 TS.

Accordingly, the digital broadcasting receiver of FIG. 1 down-converts the RF signal into baseband, demodulates and equalizes the down-converted signal, performs channel decoding, and restores the original signal in a reverse order of the digital broadcasting transmitter.

FIG. 2 shows a vestigial sideband (VSB) data frame of the U.S-oriented digital broadcasting (8-VSB) system which is inserted with the segment sync and field sync. As shown in FIG. 2, one frame consists of two fields and one field consists of one field sync segment which is the first segment and 312 data segments. Further, one segment of VSB data frame corresponds to one MPEG-2 packet and consists of a segment sync of four symbols and 828 data symbols.

In FIG. 2, the segment sync and field sync are used for synchronization and equalization in the digital broadcasting receiver. That is, the segment sync and field sync are already known data between the digital broadcasting trasmitter and receiver and are used as a reference signal on equalization of the receiver.

The VSB method of the U.S-oriented terrestrial waves digital broadcasting system as shown in FIG. 1 is a single carrier method and is weak in a multipath fading channel environment. Accordingly, performance of a receiver depends on performance of an equalizer to remove multipath.

However, according to the conventional transmission frame as shown in FIG. 2, as a field sync which is a reference signal of the equalizer appears every 313 segment, the frequency of the field sync is low compared with a signal of one frame so that equalization performance decreases.

In other words, it is not easy to estimate a channel, remove multipath, and equalize a received signal using the conventional equalizer and the above mentioned known data of small quantity. Accordingly, the conventional digital broadcasting receiver has low reception performance in a poor channel environment, especially, in the Doppler fading channel environment.

Additionally, the VSB method of the U.S-oriented terrestrial waves digital television system of FIG. 1 is a single carrier system and has the low capacity to remove multipath in the Doppler multipath fading channel. However, if the known sequence such as a field sync is used a lot, the channel is easily estimated and the equalizer easily compensated the signal distorted by multipath using the known sequence.

However, as shown in the VSB data frame of the U.S-oriented terrestrial waves digital television system of FIG. 2, a field sync which is known data appears every 313 segment. This is so small quantity, so that the capacity to remove the multipath by using this decreases. Especially, the capacity to remove multipath in the Doppler multipath fading channels is low.

DISCLOSURE OF INVENTION

Technical Problem

An aspect of the present invention is to provide a digital broadcasting transmission/reception system which insert a null packet without information at certain intervals in an MPEG-2 packet to improve reception performance of the U.S-oriented terrestrial waves digital television system of the VSB method, transmit known data and add TRS code so that the receiver detects and uses the known data, and more efficiently corrects errors by the TRS code to improve reception performance and a signal processing, method thereof.

Technical Solution

To achieve the above aspect, a digital broadcasting transmitter according to the present invention includes a TRS encoder for receiving an MPEG-2 TS and performing TRS encoding of the MPEG-2 TS, the MPEG-2 TS including null data to insert known data and TRS parity respectively at a certain location, a randomizer for randomizing the data output from the TRS encoder, a null packet replacer for replacing the null data to insert the known data of the randomized data with the known data, an RS encoder for RS-encoding the data output from the null packet replacer replacing part and adding an RS parity, an interleaver for interleaving the data output from the RS encoder, a Trellis encoder for Trellis-encoding the data output from the interleaver, and a modulator for modulating the data output from the Trellis encoder, performing RF converting and transmitting the resultant data.

Preferably, the null data to insert the known data are constructed of a certain number of segments.

Further, the data stream has the information on the insertion location and the amount of the null data, and the information is inserted prior to the location where the null data are inserted.

More preferably, the digital broadcasting transmitter further includes a control signal generator for generating a control signal to control the null packet replacer to insert the known data at the location according to the information.

Further, the Trellis encoder has a memory element for Trellis encoding operation, initiallizes the memory element at the location where the known data are inserted and performs Trellis encoding.

Preferably, the digital broadcasting transmitter further includes a packet buffer for receiving and storing the data which are output from the RS encoder and which correspond to the location where the memory element of the Trellis encoder is initialized.

The packet buffer receives the data altered according to the initialization of the memory element from the Trellis encoder.

Further, the digital broadcasting transmitter further includes a parity replacer for RS-encoding the altered data, which are input from the packet buffer, according to the initialization of the memory element, generating and outputting an altered RS parity to the Trellis encoder, so that the RS parity added by the RS encoder is replaced by the altered RS parity.

Additionally, the TRS encoder includes a buffer for storing data input in the row direction and outputting the data in the column direction, an encoder for TRS encoding the data output from the buffer and adding the TRS parity in the column direction, and a memory for receiving and storing the data added with the TRS parity and outputting the data in the row direction.

Meanwhile, a signal processing method for a digital broadcasting transmitter according to the present invention includes a TRS encoding step of receiving an MPEG-2 TS and performing TRS encoding of the MPEG-2 TS, the MPEG-2 TS including null data to insert known data and TRS parity respectively at a certain location, a randomizing step of randomizing the data output from the TRS encoding step, a null packet replacing step of replacing the null data of the randomized data to insert the known data with the known data, an RS encoding step of RS-encoding the data output from the null packet replacing step and adding RS parity, a interleaving step of interleaving the data output from the RS encoding step, a Trellis encoding step of Trellis-encoding the data output from the interleaving step, and a step of modulating the data output from the Trellis encoding step, performing RF converting and transmitting the resultant data.

A digital broadcasting receiver according to the present invention corresponding to the digital broadcasting transmitter has a demodulator for receiving a signal from the digital broadcasting transmitter and demodulating the received signal, the signal being inserted with SRS and TRS parity at a certain location, a known data output part for detecting the location of the SRS from the demodulated signal and outputting the SRS, a equalizer for equalizing the demodulated signal, a Viterbi decoder for error-correcting and decoding the equalized signal using the output SRS, a deinterleaver for deinterleaving the data output from the Viterbi decoder, a derandomizer for derandomizing the data output from the deinterleaver, and a TRS decoder for TRS-decoding the data output from the derandomizer using the TRS parity.

Preferably, the known data output part includes a known data detector for detecting the information on the certain location and an amount of the inserted SRS from the received signal, a segment flag generator for generating a data frame including at least one segment which indicates the location with a predetermined flag, a Trellis interleaver for encoding the data frame as encoded in the digital broadcasting transmitter, and a known data extractor for extracting and outputting the SRS at the location marked with the flag of the encoded data frame.

Additionally, the TRS decoder includes a buffer for storing data input in the row direction and outputting the data in the column direction, a decoder for TRS-decoding the data output from the buffer using the TRS parity, and a memory for receiving and storing the TRS-decoded data and outputting the data in the row direction.

Furthermore, a signal processing method for a digital broadcasting receiver according to the present invention includes a step of receiving a signal from the digital broadcasting transmitter and demodulating the received signal, the signal being inserted with SRS and TRS parity at a certain location, a step of detecting the location of the SRS from the demodulated signal and outputting the SRS, a step of equalizing the demodulated signal, a step of error-correcting and decoding the equalized signal using the output SRS, a step of deinterleaving the decoded data, a step of derandomizing the deinterleaved data, and a step of TRS-decoding the derandomized data using the TRS parity.

Advantageous Effects

According to the present invention, to improve reception performance of the ATSC VSB system of the U.S-oriented terrestrial waves digital television system, an MPEG-2 packet is inserted with a null packet at certain intervals, transmitted in known data, and added with TRS code so that reception performance is improved and reception range can be extended due to low required Signal to Noise Ratio (SNR). Additionally, there is compatibility with the conventional system.

BEST MODE FOR CARRYING OUT THE INVENTION

Hereinafter, the present invention is described in detail referring to accompaning drawings.

Figure 3:
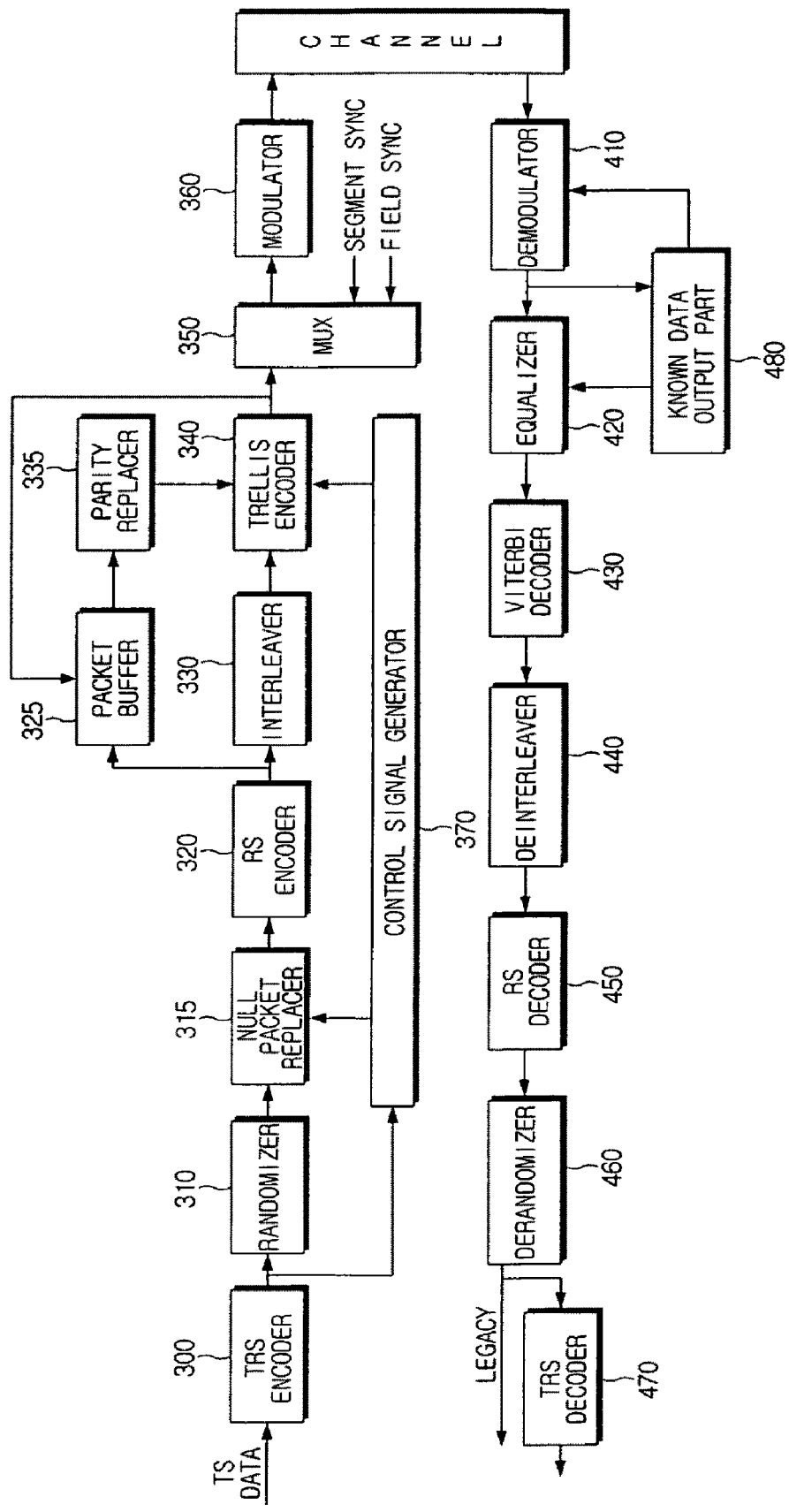
FIG. 3 is a block diagram of a digital broadcasting transmitter/receiver according to the present invention.

FIG. 3 is a block diagram of a digital broadcasting trasmitter/receiver according to the present invention.

In FIG. 3, a TS which is input to the digital broadcasting trasmitter is inserted with null data to generate a SRS, which is predefined known data between the transmitter and the receiver, and TRS code parity and this will be described in detail later.

Figure 1:
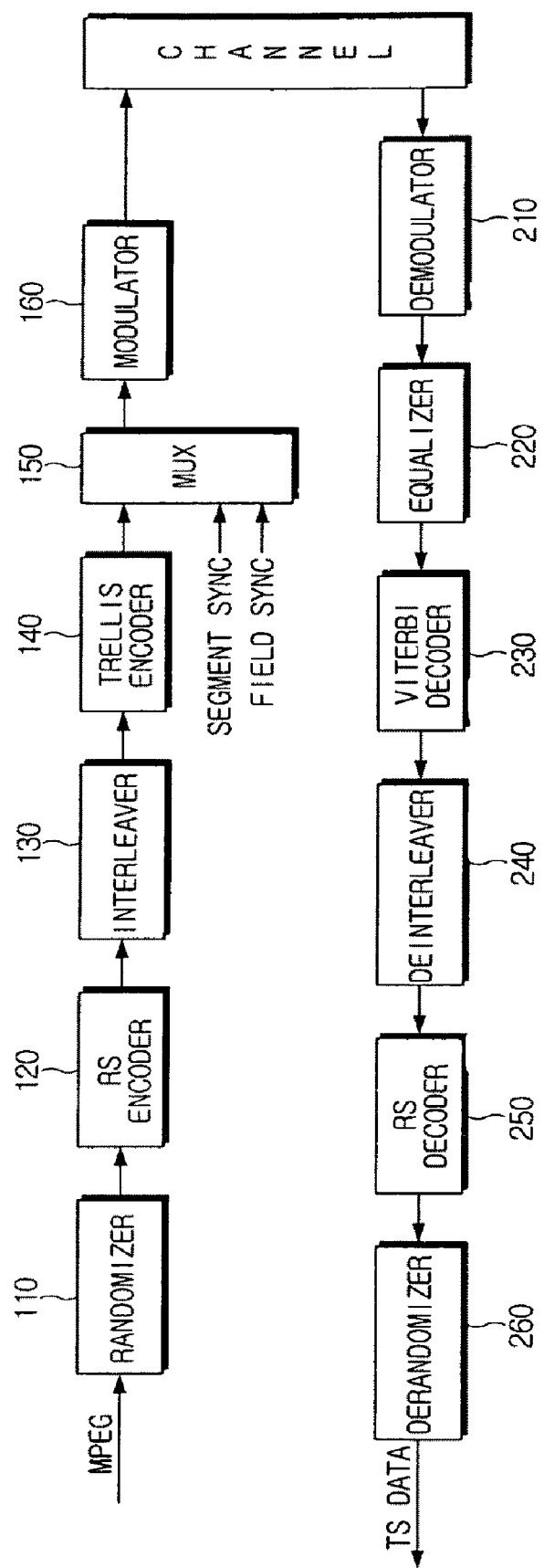
FIG. 1 is a block diagram of a general digital broadcasting (ATSC VSB) transmitter/receiver.
Figure 2:
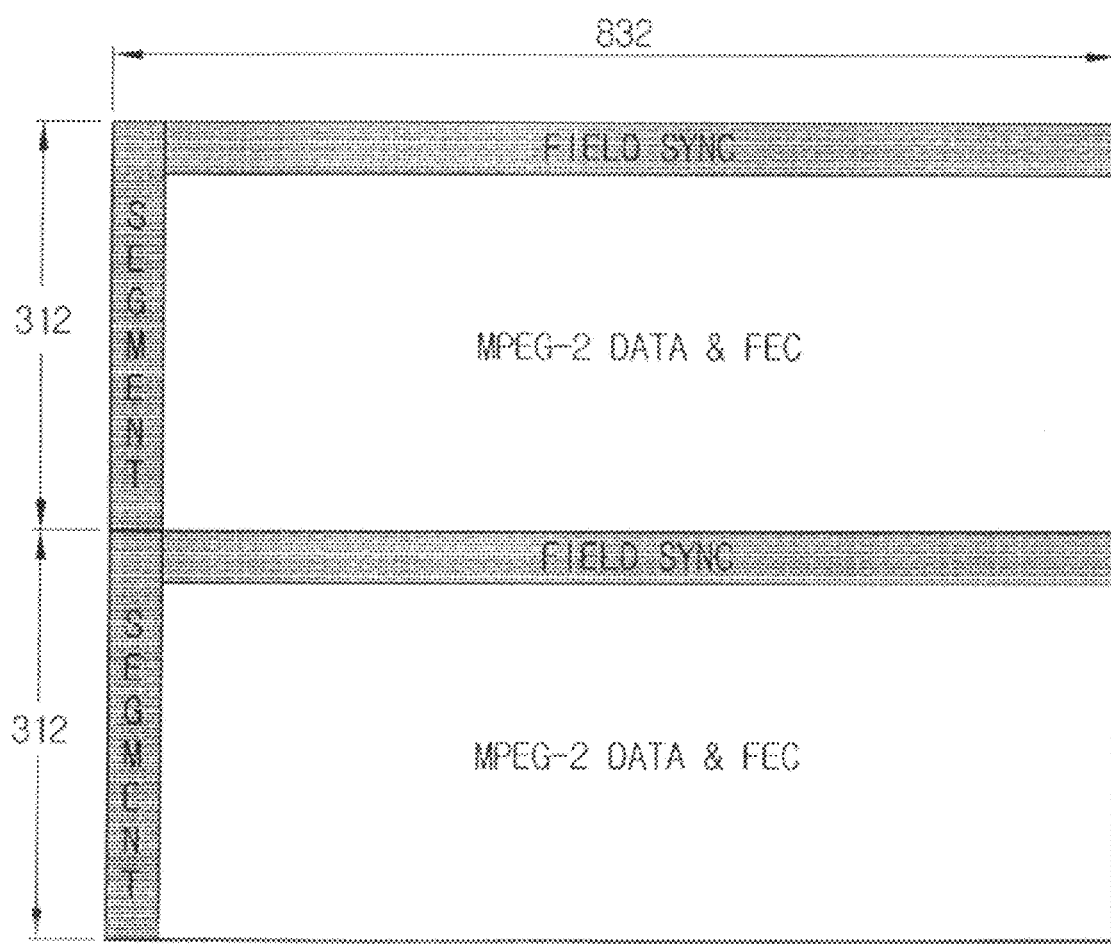
FIG. 2 is a view showing a frame structure of ATSC VSB data.

The digital broadcasting transmitter includes a TRS encoder (300) for adding RS parity in the column direction, a randomizer (310) for randomizing the data, a null packet replacer (315) for replacing null data packet of the randomized data with a SRS, an RS encoder (320) for adding a RS parity in the row direction, a packet buffer (325) for storing the RS encoded SRS in memory initialization of a Trellis encoder (340) and replacing it with a altered value according to initialization, a parity replacer (335) for RS encoding again using the altered value, generating a parity, and inputting the generated parity to the Trellis encoder (340), an interleaver (330) for interleaving the RS encoded data, the Trellis encoder (340) for converting the interleaved data into symbol and performing ⅔ rate Trellis encoding and symbol mapping, a multiplexer (350) for inserting a field sync and segment sync as a data format of FIG. 2, and a modulator (360) for inserting a pilot, performing VSB modulation, RF converting and transmitting the data. Additionally, the digital broadcasting transmitter further includes a control signal generator (370) for generating a signal to control the null data packet and a normal packet including payload data.

Figure 4:
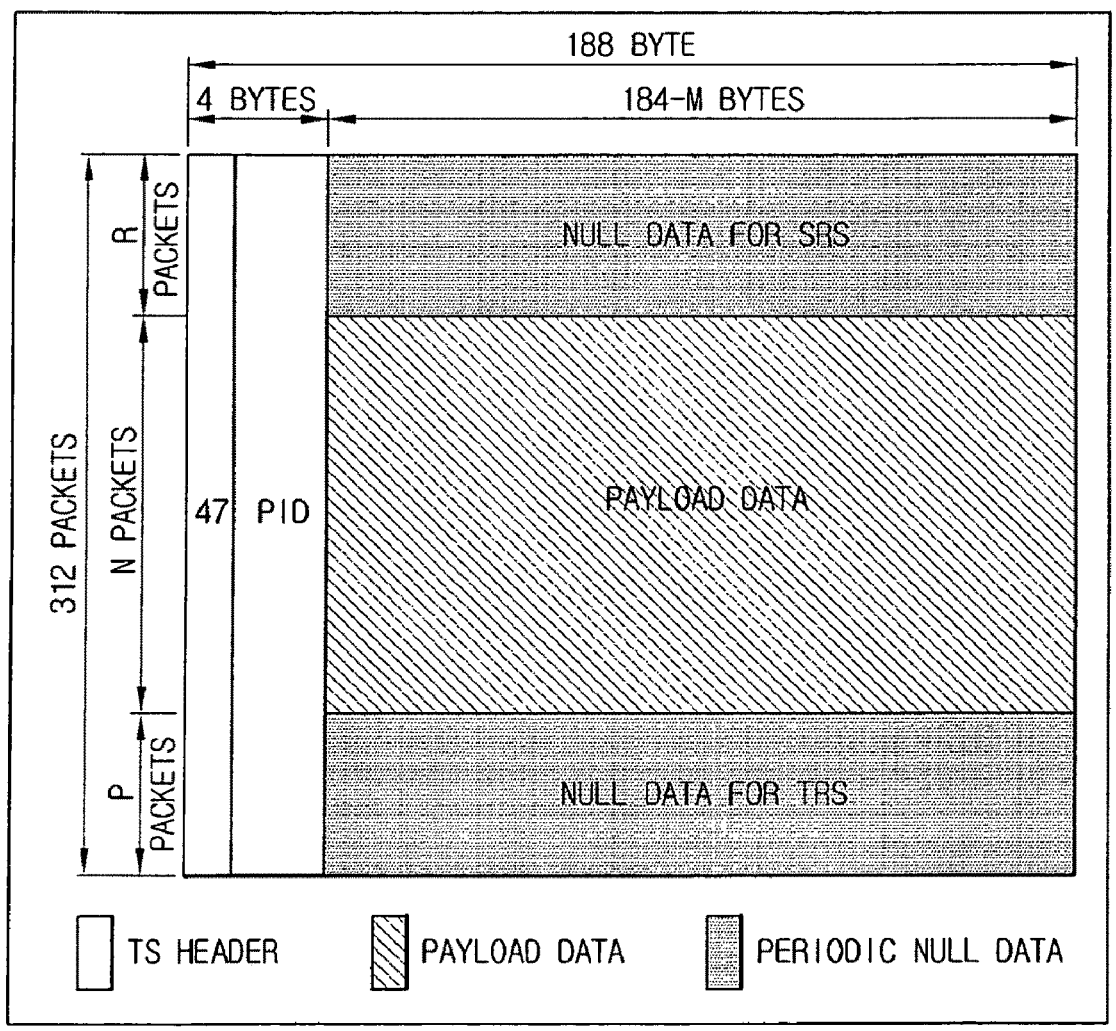
FIG. 4 is a view showing a format of TRS input data added with null data according to the present invention.

FIG. 4 shows a data format of a MPEG-2 TS input to a digital broadcasting transmitter according to the present invention.

Referring to FIG. 4, one field of the MPEG-2 TS according to the present invention consists of 312 segments with a header having a sync of the first byte and packet identity (PID) of the next three bytes. The first certain segments of a field are inserted with null data for the SRS in payload data part, and certain segments at the bottom of the field are inserted with null data for the TRS. The TRS encoder (300) performs RS encoding of the MPEG-2 TS input to the digital broadcasting transmitter in the column direction and adds RS parity, which is generated in the column direction, at the location of null data inserted in the input TS to generate TRS parity.

Figure 5:
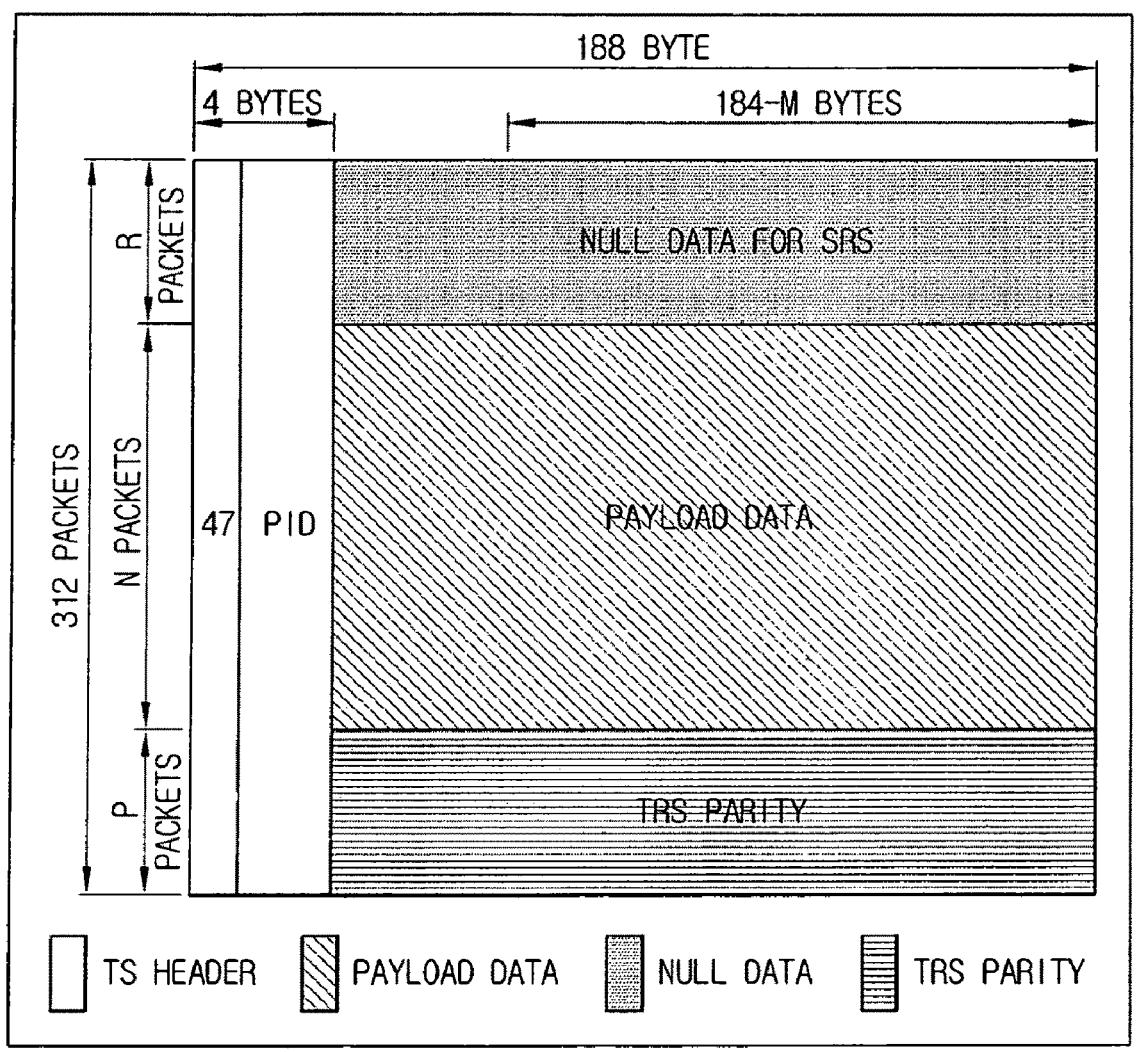
FIG. 5 is a view showing a format of the data output from a TRS encoder.

FIG. 5 shows a format of the data output from the TRS encoder (300). Referring to FIG. 5, TRS parity generated by the TRS encoder (300) is added to the location where the null data for TRS are inserted in the data format of FIG. 4.

The randomizer (310) randomizes the input MPEG-2 TS data to increase application of the allocated channel space.

The null packet replacer (315) generates a particular sequence (Hereinafter, refered to as a known data) of a certain pattern which are predefined between the transmitter and the receiver as a SRS, replaces the randomized data of the location of the null data for SRS in the randomized data and inserts the generated known data therein. The pattern of the known data is different from that of transmitted/received payload data and the SRS is easily detected from the payload data to transmit so that the SRS is utilized for synchronization and equalization of the receiver.

The RS encoder (320) RS encodes the packet data to correct errors by a channel and adds parity of certain bytes.

Figure 6:
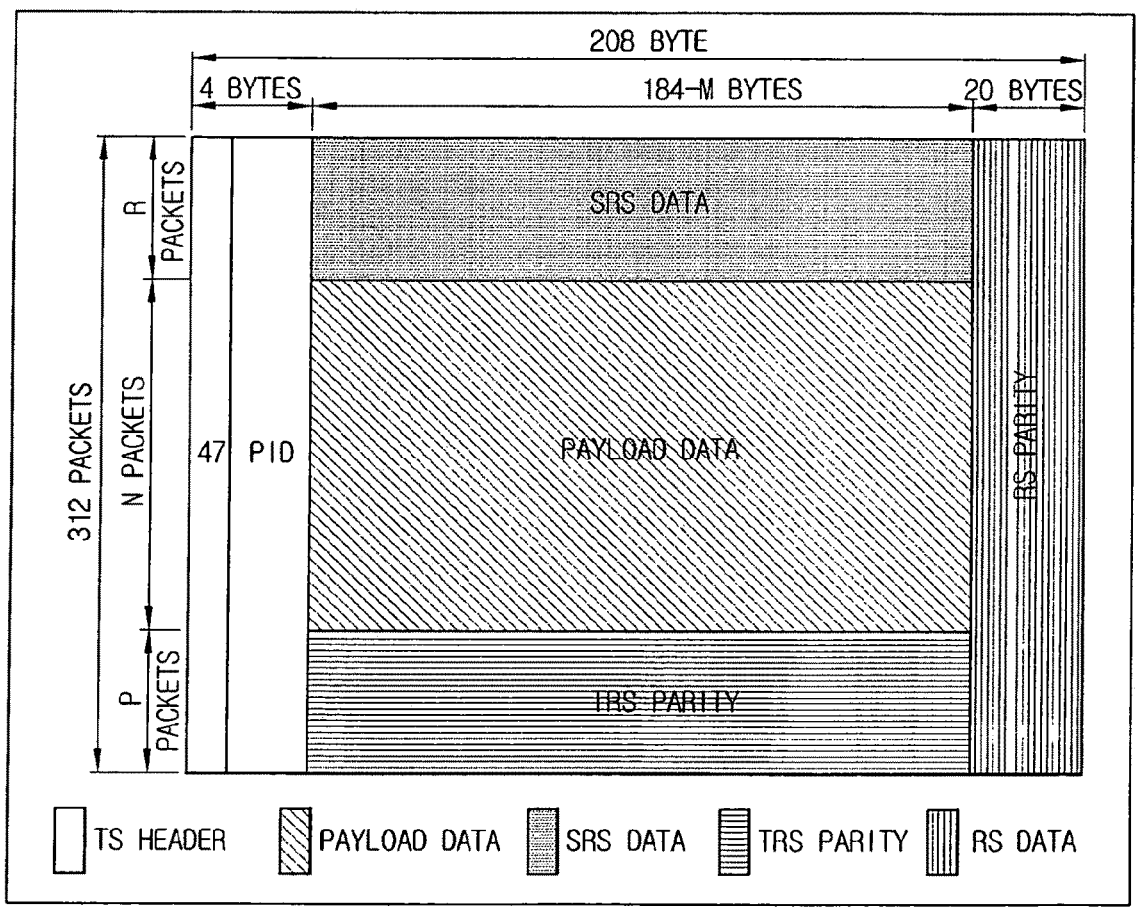
FIG. 6 is a view showing a format of data output from a null packet replacer.

FIG. 6 shows a format of the data output from the RS encoder (320). Referring to FIG. 6, the null data for the SRS are replaced with the known data of the particular sequence by the null packet replacer (315) and RS parity is added by RS encoding.

The interleaver (330) interleaves the parity-added packet output from the RS encoder (320) in a certain pattern.

The Trellis encoder (340) converts the data output from the interleaver (330) with a symbol and performs symbol mapping through ⅔ rate Trellis encoding. The Trellis encoder (340) initializes a value which is temporarily stored in its own memory element at the beginning location of the known data and Trellis-encodes the known data.

The packet buffer (325) outputs and temporarily stores the data from the beginning location of the data corresponding to the location of the known data from the packet output from the RS encoder (320). Then, when the data are Trellis-encoded according to the initialization of the Trellis encoder (340), the packet buffer (325) receives a certain amount of the altered data from the Trellis encoder (340), replaces the previous data which are temporarily stored, temporarily stores the altered data and inputs the altered data to the parity replacer (335) to replace the parity.

The parity replacer (335) receives the data altered according to the memory initialization, regenerates a parity according to the altered data, and inputs it to the Trellis encoder (340) so that the previous parity is replaced with the regenerated parity.

Figure 7:
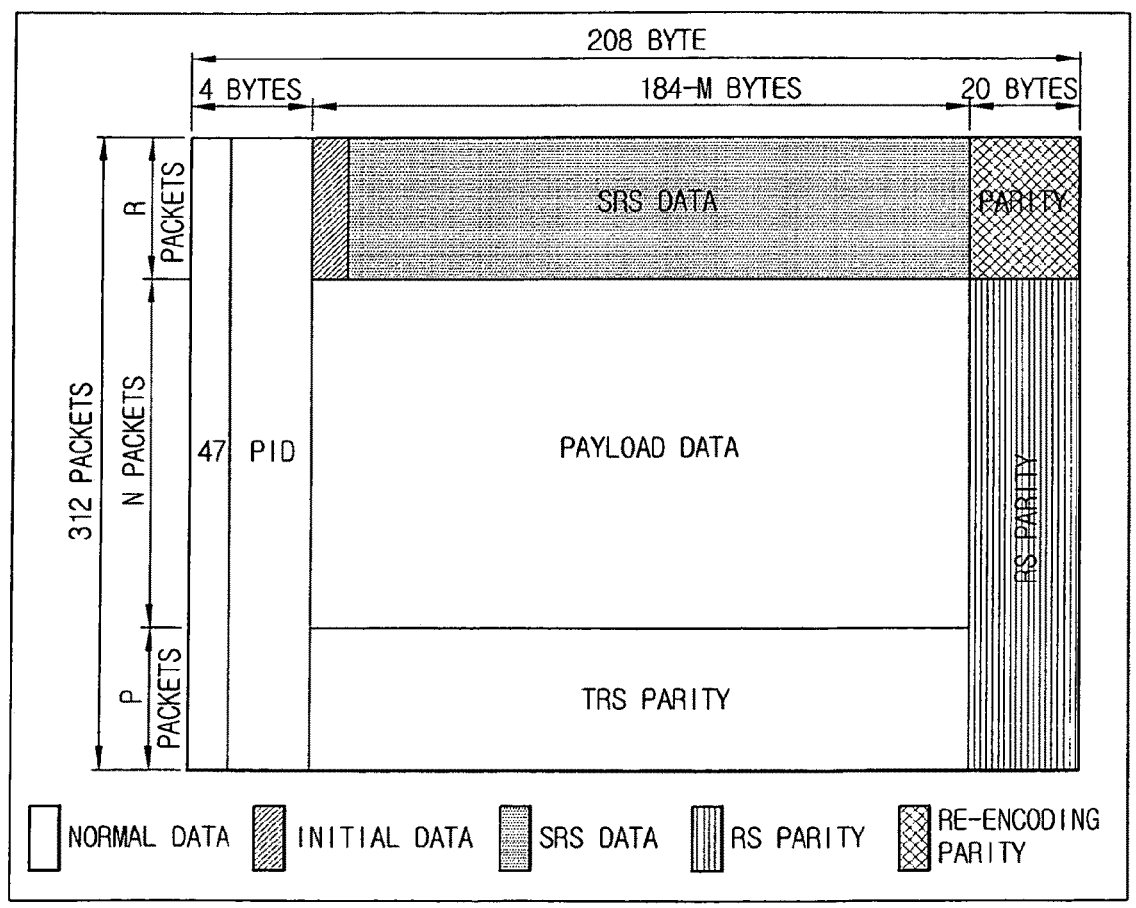
FIG. 7 is a view showing a format of data output from a parity replacer.

FIG. 7 shows a format of the data replaced and added with the parity regenerated and output from the parity replacer (335) on the data altered according to the Trellis initialization of the data output from the RS encoder (320).

Therefore, the packet data output from the Trellis encoder (340) to the multiplexer (350) has a format of the data altered according to the memory element initialization of the Trellis encoder (340) and data added with the RS parity according to RS encoding.

Figure 8:
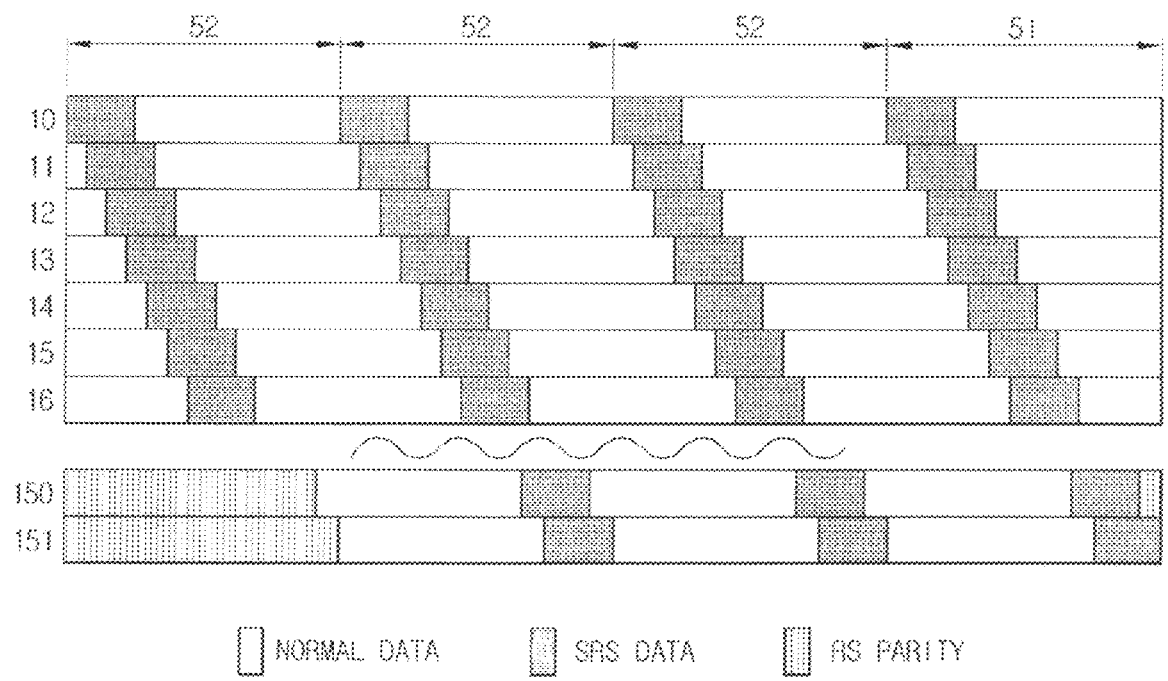
FIG. 8 is a view showing a format of data output from a data interleaver.

FIG. 8 shows a format of the data output from the interleaver (330), and indicates where data for the SRS are located and the location of the RS parity.

Referring to FIG. 8, the corresponding RS parity is located after the data for SRS. Accordingly, when the Trellis encoder (340) sequentially encodes the data input from the interleaver (330) and finishes data encoding for SRS, the parity for this is replaced with the altered parity output from the parity replacer (335) and encoded so that encoding is sequentially performed.

The multiplexer (350) inserts a segment sync in a segment unit and a field sync in a field unit in the data which are converted into symbol by the Trellis encoder (340) as the data format of FIG. 2, adds a certain DC value to a data signal of a certain level and inserts a pilot signal in edge part of low frequency band on frequency spectrum.

The modulator (360) performs pulse shaping of the signal which is inserted with the pilot signal, loads it on intermediate frequency carrier wave and modulates amplitude for VSB modulation. Then, the modulated signal is converted into RF, amplified and transmitted through a channel allocated in a certain band.

The control signal generator (370) receives the TS added with null data from the randomizer (310), detects the information on the location where the null data are added from the TS, generates a control signal to recognize the beginning location and ending location, and inputs it to the null packet replacer (315), the interleaver (320) and the Trellis encoder (340).

Meanwhile, the digital broadcasting receiver according to the present invention follows a reverse order of the transmitter and includes a demodulator (410) for lowering the RF signal to baseband and demodulating it, an equalizer (420) for deleting inter-symbol interference, a Viterbi decoder (430) for error-correcting and decoding, a deinterleaver (440), an RS decoder (450), a derandomizer (460), a TRS decoder (470) and a known data output part (480) for detecting and outputting the location of the known data.

The demodulator (410) detects and demodulates the sync according to the pilot signal and sync inserted in the baseband signal of the received signal. In addition, the equalizer (420) compensates channel distortion by multipath of a channel from the demodulated signal and deletes the received inter-symbol interference.

The Viterbi decoder (430) corrects errors, decodes the error-corrected symbol and outputs the symbol data. The decoded data rearranges the dispersed data through the deinterleaver (440).

The deinterleaved data are error-corrected through the RS decoder (450) and the error-corrected data are derandomized through the derandomizer (460).

The TRS decoder (470) corrects errors using the RS parity added in the column direction so that the data of MPEG-2 TS are restored.

Figure 9:
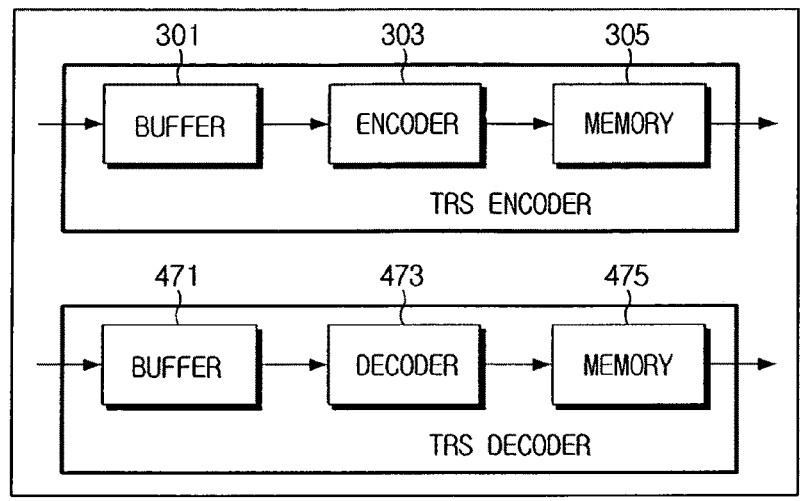
FIG. 9 is a detailed block diagram of a TRS encoder and decoder.

FIG. 9 shows a detailed block diagram of the TRS encoder (300) and TRS decoder (470) according to the present invention.

The TRS encoder (300) includes a buffer (301) for storing the data input in the row direction and outputting the data in the column direction, an encoder (303) for TRS-encoding the data input in the column direction from the buffer and adding parity in the column direction and a memory (305) for receiving and storing the data added with parity in the column direction and outputting them in the row direction.

Additionally, the TRS decoder (470) has a buffer (471) for storing the data input in the row direction and outputting them in the column direction, a decoder (473) for error-correcting the data input in the column direction from the buffer (471) using the RS parity added in the column direction, a memory (475) for storing the error-corrected data and outputting them in the row direction.

Meanwhile, the known data output part (480) detects the information on the location of the known data from the demodulated data, generates segment frame, performs encoding and outputs the generated known data, and provides them to detect sync of the demodulation (410) and compensate channel distortion of the equalizer (420).

Figure 10:
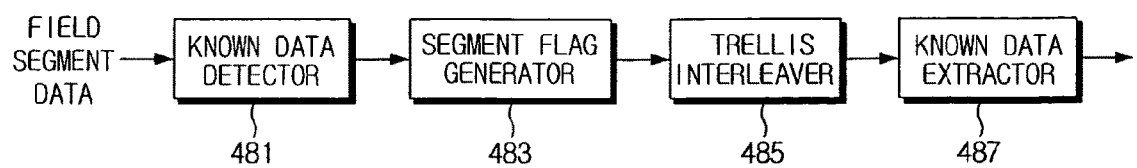
FIG. 10 is a block diagram of a known data output part.

FIG. 10 shows a detailed block diagram of the known data output part (480).

In FIG. 10, the known data output part (480) includes a known data detector (481), a segment flag generator (483), a Trellis interleaver (485), and a known data extractor (487).

The known data detector (481) detects the quantity information of null packet inserted in the reserved part of field sync data segment section of the demodulated data and acquires the information on the location and length of the known data.

According to the detected information on the quantity of the null packet, that is, the information on the location and length of the known data, the segment flag generator (483) marks with a predetermined flag of length corresponding to the number of data symbols at the corresponding location and generates at least one segment and a MPEG-2 transmission frame including the segment.

The Trellis interleaver (485) encodes the transmission frame generated in the segment flag generator (483) as encoded in the transmitter, and can detect the known data according to the flag.

Therefore, the known data extractor (487) acquires the information on the location which is detected by the flag of the transmission frames which are encoded and output from the Trellis interleaver (485), and extracts and outputs the known data at the corresponding location.

According to the present invention, in order to improve reception performance of VSB method of the U.S-oriented terrestrial waves digital television system, a null packet without information are inserted at certain intervals in an MPEG-2 packet, known symbol data are transmitted from the transmitter using them, a TRS code is added, the receiver detects and uses the known symbol data, and error-correcting is performed again using the TRS codes so that reception performance can be improved at poor multipath channels.

Moreover, SNR to meet TOV can be lowered using TRS codes. This proposed method gurantees compatibility with the existing receiver which the ATSC proposed and system performance can be improved without performance degradation of the existing receiver.

Accordingly, reception performance of ATSC VSB method, the U.S-oriented terrestrial waves DTV system, according to the present invention can be enhanced.

The invention claimed is:

1. A digital broadcast receiver, comprising:
a demodulator to receive a transport stream (TS), and demodulate the received TS;
a known data output part to detect location of known data from the TS;
an equalizer to equalize the demodulated TS using the known data; and
a TRS decoder to TRS-decode the TS,
wherein the TS is generated by a digital broadcast transmitter adding an RS parity at an end position of data, inserting the known data into the data, RS encoding the data to add a parity, and interleaving the data which the know data is inserted,
wherein the TS is trellis-encoded by a trellis encoder included in the digital broadcast transmitter, and the trellis encoder resets a plurality of internal memories, which are used to trellis-encode the TS, at a predetermined time in response to a control signal for controlling the memory reset.

2. The digital broadcast receiver of claim 1, wherein the digital broadcast transmitter further comprises a parity replacer to perform compensation on the RS parity according to the memory reset.

3. The digital broadcast receiver of claim 1, wherein the known data is inserted into a predetermined position of the TS by the digital broadcast transmitter according to a control signal for controlling the insertion of the known data.

4. The digital broadcast receiver of claim 1, wherein the TRS decoder performs error correction on the TS using the RS parity added in a column direction in the TS.

5. The digital broadcast receiver of claim 1, wherein the TRS decoder comprises:
 a buffer to store data input in a row direction and output the data in a column direction;
 a decoder to perform error correction on the data output in a column direction from the buffer using the RS parity added in the column direction; and
 a memory to store the error-corrected data and output the data in the row direction.

6. The digital broadcast receiver of claim 1, wherein the known data output part detects information regarding the known data from the TS demodulated by the demodulator, and detects the known data using the detected information.

7. The digital broadcast receiver of claim 1, wherein the known data output part comprises:
 a known data detector to detect the information regarding the known data from the TS demodulated by the demodulator;
 a segment flag generator to generate a segment by indicating an identification according to the detected information, and generate a transport frame containing the generated segment;
 a trellis interleaver to encode the generated transport frame to correspond to that of the digital broadcast transmitter; and
 a known data extractor to extract the known data from the transport frame output from the trellis interleaver according to the identification.

8. A stream processing method of a digital broadcast receiver, the stream processing method comprising:
 receiving a transport stream (TS), and demodulating the received TS;
 detecting location of known data from the TS;
 equalizing the demodulated TS using the known data; and
 TRS-decoding the TS,
 wherein the TS is generated by a digital broadcast transmitter adding an RS parity at an end of data, inserting the known data into the data, RS encoding the data to add a parity, and interleaving the data which the known data is inserted,
 wherein the TS is trellis-encoded by a trellis encoder included in the digital broadcast transmitter, and the trellis encoder resets a plurality of internal memories, which are used to trellis-encode the TS, at a predetermined time in response to a control signal for controlling the memory reset.

9. The stream processing method of claim 8, wherein the digital broadcast transmitter further comprises a parity replacer to perform compensation on the RS parity according to the memory reset.

10. The stream processing method of claim 8, wherein the known data is inserted into a predetermined position of the TS by the digital broadcast transmitter according to a control signal for controlling the insertion of the known data.

11. The stream processing method of claim 8, wherein the TRS-decoding operation comprises performing error correction on the TS using the RS parity added in a column direction in the TS.

12. The stream processing method of claim 8, wherein the TRS-decoding operation further comprises:
 buffering data input in a row direction and outputting the data in a column direction;
 performing error correction on the data output in the column direction using the RS parity added in the column direction; and
 outputting the error-corrected data in the row direction.

13. The stream processing method of claim 8, wherein the detecting operation comprises detecting information regarding the known data from the demodulated TS, and detecting the known data using the detected information.

14. The stream processing method of claim 8, wherein the detecting operation further comprises:
 detecting the information regarding the known data from the demodulated TS;
 generating a segment by indicating an identification according to the detected information, and generating a transport frame containing the generated segment;
 encoding the generated transport frame to correspond to that of the digital broadcast transmitter; and
 extracting the known data from the encoded transport frame according to the identification.

* * * * *